(No Model.)

J. B. FELLOWS.
TRAVELING LAWN SPRINKLER.

No. 548,358. Patented Oct. 22, 1895.

Witnesses:
Nathan Clifford.
Grace G. Pollard.

Inventor:
Jerome B. Fellows.
By Elgin Merrill
Atty.

UNITED STATES PATENT OFFICE.

JEROME B. FELLOWS, OF CONWAY, NEW HAMPSHIRE, ASSIGNOR TO THE PORTLAND LAWN SPRINKLER COMPANY, OF PORTLAND, MAINE.

TRAVELING LAWN-SPRINKLER.

SPECIFICATION forming part of Letters Patent No. 548,358, dated October 22, 1895.

Application filed March 13, 1893. Serial No. 465,807. (No model.)

*To all whom it may concern:*

Be it known that I, JEROME B. FELLOWS, a citizen of the United States, residing at Conway, in the county of Carroll and State of New Hampshire, have invented certain new and useful Improvements in Traveling Lawn-Sprinklers; and I do hereby declare the following to be a full, clear, and exact description of the invention, such as will enable others skilled in the art to which it appertains to make and use the same.

My invention relates to improvements in traveling lawn-sprinklers, and particularly in lawn-sprinklers adapted to receive a forward motion imparted by water escaping from rotary sprinkler-arms.

It consists in combining therewith mechanism for automatically stopping the onward motion of the sprinkler, after it has traveled a specified distance, without stopping the flow of water out of the sprinkler-arms.

It further consists in mechanism for readily setting said stopping mechanism, so that the machine will stop at any desired distance from the starting-point, and in other details of construction which will be hereinafter described.

Figure 1:
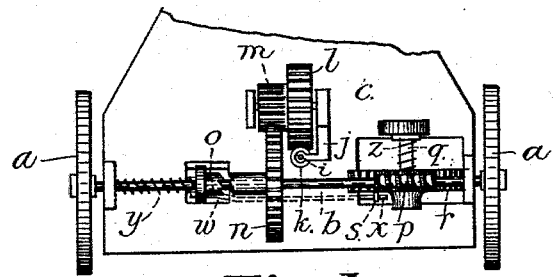
Figure 2:
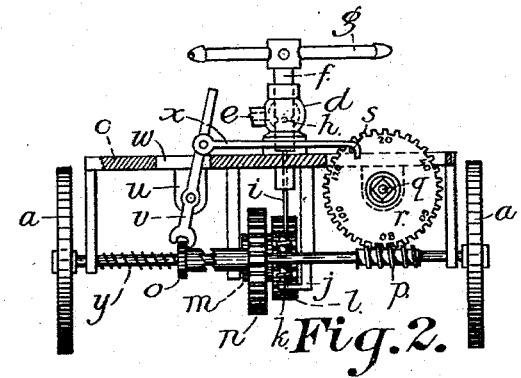
Figure 3:
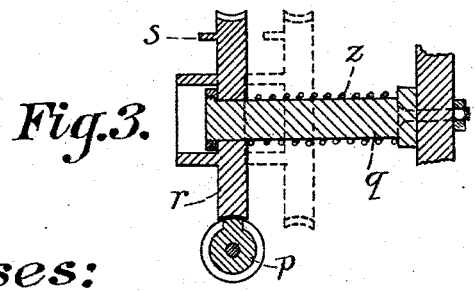

In the drawings herewith accompanying and making a part of this application, Figure 1 is a bottom plan of my improved sprinkler, the steering-wheel being removed. Fig. 2 is a front elevation of the same, and Fig. 3 is a detail in section of the automatic lever-operating mechanism.

Same letters refer to like parts.

In said drawings, $a$ represents the forward supporting-wheels, $b$ the forward axle, and $c$ the platform, upon which a stand-pipe is mounted. On the said platform is a standpipe $d$, having a nipple $e$, to which the water-supply hose may be attached. Set in said stand-pipe and adapted to rotate therein is a pipe $f$, carrying sprinkler-arms $g$ and having openings $h$ inside of said stand-pipe. Rigidly attached to the bottom of said rotary pipe is a vertical shaft $i$, extending down through the bottom of said stand-pipe and below the platform. The bottom of said vertical shaft is stepped in a hanger $j$ and below the platform carries a worm $k$. Mounted on a suitable shaft is a gear-wheel $l$, adapted to mesh with said worm, and on the same shaft is a pinion $m$. Loosely set on axle $b$ are a gear $n$, meshing with said pinion $m$, and a sliding clutch $o$, adapted to engage with the gear $n$, and when thus engaged to prevent said gear from turning on said axle. It will be evident that when said clutch engages said gear the rotation of the sprinkler-arms will impart to the machine a forward motion upon the ground and that this forward motion will continue so long as the sprinkler-arms continue to revolve. Sometimes it is important that the sprinkler should travel a certain distance and then stop. To adapt the machine to this purpose, I place on the axle $c$ a worm $p$ and on the shaft $q$ a cog-gear $r$, adapted to mesh with said worm. On the side of said gear are a graduated scale and a lug $s$. Said gear projects up through a slot in the platform. Pivotally set in hangers $u$ is a lever $v$, adapted to engage and operate the sliding clutch $o$, said lever extending up through a slot $w$ in the platform and having pivotally attached thereto a link $x$, adapted to engage at certain times with the lug $s$ on the gear $r$. A spring $y$ constantly tends to force said clutch to engage with the gear $n$. The gear $r$ is adapted to mesh with a worm $p$ on the axle, and a spring $z$ constantly tends to force it forward and hold it in engagement with the worm $p$, said gear being adapted to slide on its bearing.

The operation of my improved lawn-sprinkler is as follows: The water escaping from the sprinkler-arms causes the pipe to rotate inside the stand-pipe. Said worm, in connection with the gears before described, causes the machine to move over the ground when the sliding clutch is in engagement with the cog-wheel on the axle, but does not cause it to move when said clutch is disengaged. To set the automatic stopping mechanism, force the cog-wheel $r$ forward until its teeth are released from the worm on the axle, as shown in Fig. 3 in dotted lines, and then turn said cog-wheel until the figures denoting the number of feet the machine is to travel before stopping comes uppermost, and allow the cog to return into mesh with said worm. The cog-wheel $r$ is timed with respect to the worm on the axle of the supporting-wheels, so that each revolution of the supporting-wheels turns the cog-wheel one cog space. Thus if the sprinkler is to travel a space equal to sixty circumferences of the supporting-wheels turn the cog-wheel until No. 60 is on top, and then when the cog is turned sixty cog spaces the lever will disengage the clutch and the machine will stop; but the rotary arms do not.

My improved automatic stopping mechanism is adapted to any traveling lawn-sprinkler which is operated by water escaping from rotary sprinkler-arms, and I do not wish to limit myself to the particular form of traveling lawn-sprinkler herein described, nor do I wish to confine myself to the particular arrangement of the stopping mechanism herein described.

The advantages of my improved lawn-sprinkler over those now in use are that the sprinkler may be made to stop automatically at any desired point without at the same time shutting off the water and that it can be readily and quickly set to stop at any desired point.

Having thus described my invention and its use, I claim—

The combination with a traveling lawn sprinkler having rotary sprinkler arms, a rotary vertical shaft adapted to be rotated by said arms and having a worm on its lower extremity meshing with gear for propelling the machine upon the ground, of a worm on the axle, a gear mounted in a suitable frame, meshing with said worm and having a graduated scale and a lug on the side thereof, a lever pivoted in the machine frame, a clutch on the axle adapted to engage the gear on said axle and a link connecting said lever and said lug, substantially as and for the purposes set forth.

In testimony whereof I affix my signature in presence of two witnesses.

JEROME B. FELLOWS.

Witnesses:
ELGIN C. VERRILL,
NATHAN CLIFFORD.